(12) United States Patent
Yonehana (10) Patent No.: US 9,211,803 B2
(45) Date of Patent: Dec. 15, 2015

(54) ELECTRIC VEHICLE CONTROL DEVICE

(75) Inventor: Atsushi Yonehana, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 203 days.

(21) Appl. No.: 14/008,217

(22) PCT Filed: Feb. 10, 2012

(86) PCT No.: PCT/JP2012/053178
§ 371 (c)(1),
(2), (4) Date: Sep. 27, 2013

(87) PCT Pub. No.: WO2012/132582
PCT Pub. Date: Oct. 4, 2012

(65) Prior Publication Data
US 2014/0015455 A1    Jan. 16, 2014

(30) Foreign Application Priority Data

Mar. 31, 2011    (JP) .................................. 2011-079749

(51) Int. Cl.
*H02P 1/00*    (2006.01)
*B60L 11/18*    (2006.01)
(Continued)

(52) U.S. Cl.
CPC ............. *B60L 11/1851* (2013.01); *B60L 1/003* (2013.01); *B60L 3/003* (2013.01); *B60L 3/0084* (2013.01);
(Continued)

(58) Field of Classification Search
USPC .......... 318/139; 320/10.1, 9.1, 139, 102, 103, 320/104, 109, 134, 136, 150, 137, 163, 293, 320/162, 155; 180/446, 65.29, 65.1, 65.8; 307/10.1
See application file for complete search history.

(56) References Cited

U.S. PATENT DOCUMENTS

| | | |
|---|---|---|
| 6,326,765 B1 | 12/2001 | Hughes et al. |
| 6,624,610 B1 | 9/2003 | Ono et al. |

(Continued)

FOREIGN PATENT DOCUMENTS

| | | |
|---|---|---|
| CN | 1342123 A | 3/2002 |
| CN | 1493476 A | 5/2004 |

(Continued)

OTHER PUBLICATIONS

Chinese Office Action with English Translation dated Apr. 1, 2015, 11 pages.

(Continued)

*Primary Examiner* — Shawki S Ismail
*Assistant Examiner* — Jorge L Carrasquillo
(74) *Attorney, Agent, or Firm* — Rankin, Hill & Clark LLP (57) ABSTRACT

Provided is an electric vehicle control device in which a power supply device has a simple structure. A BMU power supply device (110) lowers a battery voltage to be suitable for the control voltage of a BMU (109). A flyback down-regulator (80) lowers the battery voltage to be suitable for an input of a CPU power supply device (111) which forms a control voltage for a CPU (108). A contactor (90) is disposed on a plus-side line which connects a battery (40) to a motor drive circuit (100), and is opened and closed in response to an instruction from the CPU (108). Control power for the down-regulator (80) is formed by the BMU power supply device (110), and a main switch (113) is disposed to open and close a path through which the voltage of the control power is input to the down-regulator (80).

5 Claims, 10 Drawing Sheets

(51) Int. Cl.
  *B62M 7/12* (2006.01)
  *B60L 15/00* (2006.01)
  *B62K 11/10* (2006.01)
  *B60L 1/00* (2006.01)
  *B60L 3/00* (2006.01)
  *B60L 3/12* (2006.01)

(52) U.S. Cl.
  CPC ............... *B60L 3/12* (2013.01); *B60L 11/1803* (2013.01); *B60L 11/1816* (2013.01); *B60L 11/1861* (2013.01); *B60L 11/1864* (2013.01); *B60L 11/1874* (2013.01); *B60L 11/1877* (2013.01); *B60L 11/1879* (2013.01); *B60L 15/007* (2013.01); *B62K 11/10* (2013.01); *B62M 7/12* (2013.01); *B60L 2200/12* (2013.01); *B60L 2210/12* (2013.01); *B60L 2210/30* (2013.01); *B60L 2220/46* (2013.01); *B60L 2240/12* (2013.01); *B60L 2240/36* (2013.01); *B60L 2240/421* (2013.01); *B60L 2240/423* (2013.01); *B60L 2240/545* (2013.01); *B60L 2240/547* (2013.01); *B60L 2240/549* (2013.01); *B60L 2250/16* (2013.01); *B60L 2250/24* (2013.01); *B62K 2202/00* (2013.01); *B62K 2204/00* (2013.01); *Y02T 10/7005* (2013.01); *Y02T 10/705* (2013.01); *Y02T 10/7044* (2013.01)

(56) References Cited

U.S. PATENT DOCUMENTS

| 7,082,018 | B2* | 7/2006 | Honda | 361/18 |
| 7,096,984 | B2 | 8/2006 | Ono et al. | |
| 7,210,550 | B2 | 5/2007 | Yonehana et al. | |
| 7,477,038 | B2* | 1/2009 | Taniguchi | 320/104 |
| 8,360,188 | B2* | 1/2013 | Yonehana et al. | 180/220 |
| 8,662,232 | B2 | 3/2014 | Nakamura et al. | |
| 8,970,061 | B2* | 3/2015 | Nakagawa | B60L 3/0046 307/10.1 |
| 2003/0029654 | A1* | 2/2003 | Shimane | B60K 6/28 180/65.29 |
| 2004/0090748 | A1* | 5/2004 | Kishimoto et al. | 361/719 |
| 2005/0088142 | A1* | 4/2005 | Chen | 320/128 |
| 2007/0068727 | A1* | 3/2007 | Miura | B62D 5/046 180/446 |
| 2009/0140673 | A1* | 6/2009 | Kasai et al. | 318/139 |
| 2009/0243554 | A1* | 10/2009 | Gu | B60K 6/48 320/162 |
| 2010/0163326 | A1 | 7/2010 | Takamura et al. | |
| 2010/0164439 | A1* | 7/2010 | Ido | B60L 11/182 320/155 |
| 2010/0244782 | A1* | 9/2010 | Nagayama et al. | 320/162 |
| 2011/0320830 | A1* | 12/2011 | Ito | 713/300 |
| 2012/0049794 | A1* | 3/2012 | Han et al. | 320/109 |

FOREIGN PATENT DOCUMENTS

| EP | 1481881 A2 | 12/2004 |
| EP | 2301790 A2 | 3/2011 |
| EP | 2479069 A1 | 7/2012 |
| EP | 2479094 A1 | 7/2012 |
| JP | 2001-119801 | 4/2001 |
| JP | 2004-187329 | 7/2004 |
| JP | 2010-279120 | 12/2010 |
| WO | 2011/033966 A1 | 3/2011 |
| WO | 2011/033967 A1 | 3/2011 |
| WO | 2011/036784 | 3/2011 |

OTHER PUBLICATIONS

European Search Report dated Jun. 10, 2015, 8 pages.

* cited by examiner

ELECTRIC VEHICLE CONTROL DEVICE

TECHNICAL FIELD

The present invention relates to an electric vehicle control device, and more particularly, to an electric vehicle control device suitable for simplifying a vehicle battery and a circuit for supplying power to a control device of a vehicle motor drive circuit.

BACKGROUND ART

Conventionally, an electric vehicle includes a motor control device which controls a traction motor for driving the electric vehicle, a battery management unit which manages a battery for supplying power to a device such as the traction motor, and power supply devices installed respectively on the motor control device and the battery management unit.

For example, Patent Literature 1 discloses an electric vehicle control device including a VTC microcomputer (first controller) which controls a traction motor, a BMC microcomputer (second controller) which manages a battery, and a mutual startup unit. When one of the controllers starts up, the mutual startup unit starts up the other of the controllers through a communication path.

CITATION LIST

Patent Documents

Japanese Patent Application Publication No. 2004-187329 A

SUMMARY OF INVENTION

Technical Problem

In the electric vehicle control device disclosed in Paten Literature 1, the battery can only be recharged after both the first and second controllers start up, and thus, it is necessary to cope with communication failure between the first and second controllers, which makes the control device complex and expensive.

An object of the present invention is to solve the problems and provide an electric vehicle control device which can simplify a vehicle battery and a power supply circuit for supplying power to a control device of a traction motor drive circuit.

Solution to Problem

To achieve the above objects, in accordance with a first feature of the present invention, an electric vehicle control device having a motor drive circuit for driving a vehicle drive motor using power of a battery, a battery monitoring unit for monitoring a state of the battery, and a main CPU for controlling the motor drive circuit, the electric vehicle control device comprising: a BMU power supply device configured to lower an output voltage of the battery to a value suitable for a control voltage for the battery monitoring unit; a down-regulator configured to lower the output voltage of the battery to a value suitable for an input to a CPU power supply device which generates a control voltage for the main CPU; and a contactor provided on a plus-side line between the battery and the motor drive circuit so as to be opened and closed in response to an instruction of the main CPU, wherein control power for the down-regulator is generated by the BMU power supply device. In accordance with a second feature of the present invention, the electric vehicle control device further comprising a main switch configured to open and close a passage through which a voltage of the control power is input to the down-regulator.

In accordance with a third feature of the present invention, an output of the BMU power supply device is input to the down-regulator through the main switch as control power.

In accordance with a fourth feature of the present invention, the motor drive circuit, the battery monitoring unit, the main CPU, the BMU power supply device, the down-regulator, and the contactor are mounted on a single board to configure a control module.

In accordance with a fifth feature of the present invention, the down-regulator is a flyback or forward type regulator.

In accordance with a sixth feature of the present invention, the electric vehicle control device is used for an electric vehicle in which a driving wheel is supported by a swing arm configured to be vertically swung with respect to a vehicle body frame, wherein the swing arm includes a main body case; the vehicle drive motor, the battery, and the control module are disposed in the main body case of the swing arm; a fuse is provided between a plus terminal of the battery and a plus terminal of the control module; and minus terminals of the battery and the control module are earthed to the main body case of the swing arm.

In accordance with a seventh feature of the present invention, the board includes a conductive pattern forming an earth line, and the control module is earthed to the main body case by coupling the conductive pattern to a case made of a conductive material of the control module using a screw.

Advantageous Effects of Invention

According to the first to third features of the present invention, the output voltage of the battery powers the battery monitoring unit to constantly monitor the state of the battery. If the main switch is turned on, the down-regulator is immediately operated to supply power to the main CPU so that the main CPU can turn on the contactor to supply the battery voltage to the motor drive circuit. Particularly, according to the first feature, the battery monitoring unit can be operated independently of the main CPU using the power of the battery solely.

In addition, the down-regulator can be operated by turning on the main switch so as to lower a voltage input from the battery and supply the lowered voltage to the main CPU as an operating voltage. Therefore, a configuration dedicated to supply operating power to the main CPU during the time of recharge is not necessary in a charger circuit, and thus the charger circuit can have a small size. According to the second feature, since the main switch is provided in a low voltage system, the main switch can be a low-capacity switch, and wires can be easily protected. In addition, the battery can be recharged only by operating the main CPU using the down-regulator to turn on the contactor, and the battery monitoring unit can individually monitor the recharge state of the battery.

According to the fourth feature of the present invention, since the control module is constructed by disposing elements on the single board, wires necessary for connecting the discrete elements can be reduced for size reduction, and the electric vehicle control device can be more simply attached to an electric vehicle.

According to the fifth feature of the present invention, since the down-regulator is a flyback or forward type regulator, insulation features thereof can be superior.

According to the sixth feature of the present invention, a fuse is disposed between the plus terminal of the control module and the battery, and the battery and the minus terminal of the control module are earthed to the main body case of the swing arm, so that the voltage of the battery can be prevented from being applied to an external part or place.

According to the seventh feature of the present invention, the structure of earth connection can be simplified by connecting the conductive pattern on the board and the case made of a conductive material of the control module to the main body case of the swing arm using a screw.

DESCRIPTION OF EMBODIMENTS

Figure 1:
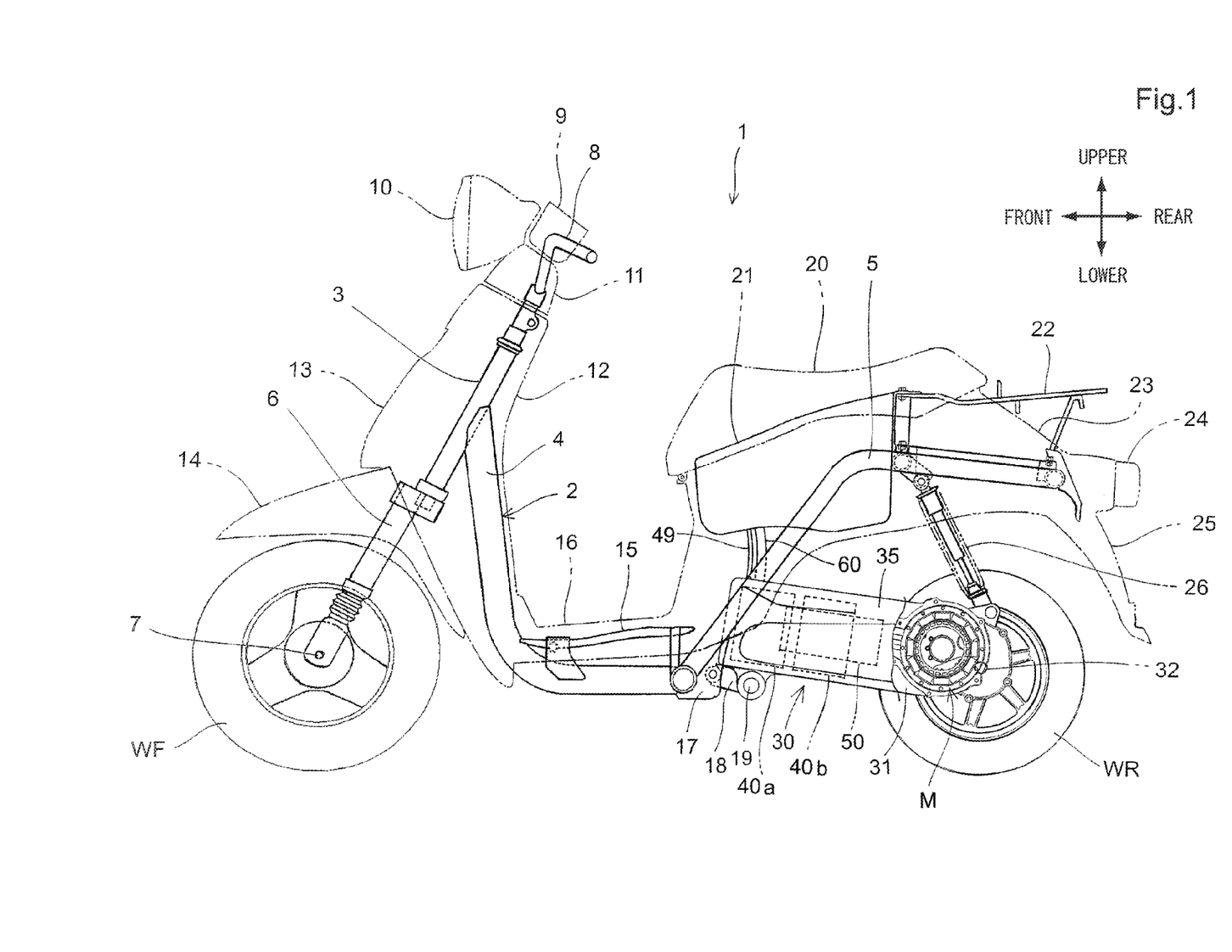
FIG. 1 is a side view illustrating an electric vehicle including an electric vehicle control device according to an embodiment of the present invention.

Hereinafter, preferred embodiments of the present invention will be described in detail with reference to the accompanying drawings. FIG. 1 is a side view illustrating an electric vehicle including an electric vehicle control device according to an embodiment of the present invention. An electric vehicle 1 is a scooter type saddle motorcycle having a lower floor 16, and a rear wheel WR thereof is driven by an electric motor M accommodated in a swing arm (swing unit) 30. A head pipe 3, by which a stem shaft (not shown) is rotatably supported, is coupled to a front portion of a vehicle body frame 2. A steering handle 8 covered with a handle cover 11 is coupled to an upper end of the stem shaft, and a pair of left and right front forks 6 is coupled to the other lower end of the stem shaft to rotatably support a front wheel WF using an axle 7.

The vehicle body frame 2 includes a main pipe 4 extending downward from a rear portion of the head pipe 3, and rear frames 5 connected to a rear end portion of the main pipe 4 and extending toward a vehicle body rear upper side. A floor frame 15 is installed on a portion of the main pipe 4 extending under the lower floor 16 in a vehicle body length direction, so as to support the lower floor 16. A pair of left and right pivot plates 17 is installed on a joint portion between the main pipe 4 and the rear frames 5.

The swing arm 30 is a cantilever type swing arm only provided at the left side in the vehicle width direction. The swing arm 30 is pivotally supported by the vehicle body frame 2 through a swing shaft 19 inserted in the vehicle width direction into links 18 installed on the pivot plates 17. The swing arm 30 is formed of a metal such as aluminum and has a partially hollow structure, and a swing arm cover 35 is installed on a main body case 31 at the left side in the vehicle width direction. The electric motor M is accommodated in the swing arm 30 at a position close to an axle 32. A power control unit (PCU) 50 including a battery management unit (BMU) and a main CPU for controlling the electric motor M is disposed at a vehicle body front side of the electric motor M. Battery modules 40a and 40b constituting a battery for supplying power to a device, such as the electric motor M, are disposed at a vehicle body front side of the swing arm 30 on the right of the PCU 50 in the vehicle width direction.

The rear wheel WR is rotatably supported by the swing arm 30 through the axle 32, and a rear end portion of the swing arm 30 is suspended from the rear frame 5 through a rear cushion 26. A storage box 21 in which things can be put is disposed under a seat 20 between the pair of left and right rear frames 5.

A vehicle body front side of the main pipe 4 of the vehicle body frame 2 is covered with a front cowl 13, and a vehicle body rear side of the main pipe 4 is covered with a leg shield 12. A meter device 9 is disposed on top of the handle cover 11, and a headlight 10 is disposed on a vehicle body front side of the meter device 9. A front fender 14 is fixed to upper portions of the front forks 6 for covering the front wheel WF.

Vehicle-width outer sides of the rear frames 5 are covered with a seat cowl 23, and a tail light device 24 is installed on a rear end portion of the seat cowl 23. A rear carrier 22 coupled to the rear frames 5 protrudes above the tail light device 24, and a rear fender 25 is provided under the tail light device 24 to cover a rear upper side of the rear wheel WR.

An end portion of a duct 60 having a hollow pipe shape is installed at the vehicle body front side of the swing arm 30. The other end portion of the duct 60 is connected to a vehicle body side connection portion, that is, to a lower portion of the storage box 21. In addition, a throttle cable 49 connected to a throttle position sensor (refer to FIG. 3) extends from the inside of the swing arm 30. An end of the throttle cable 49 extends toward the front side of the vehicle body along the vehicle body frame 2 and is connected to a throttle grip (not shown) installed on a right end of the steering handle 8.

Figure 2:
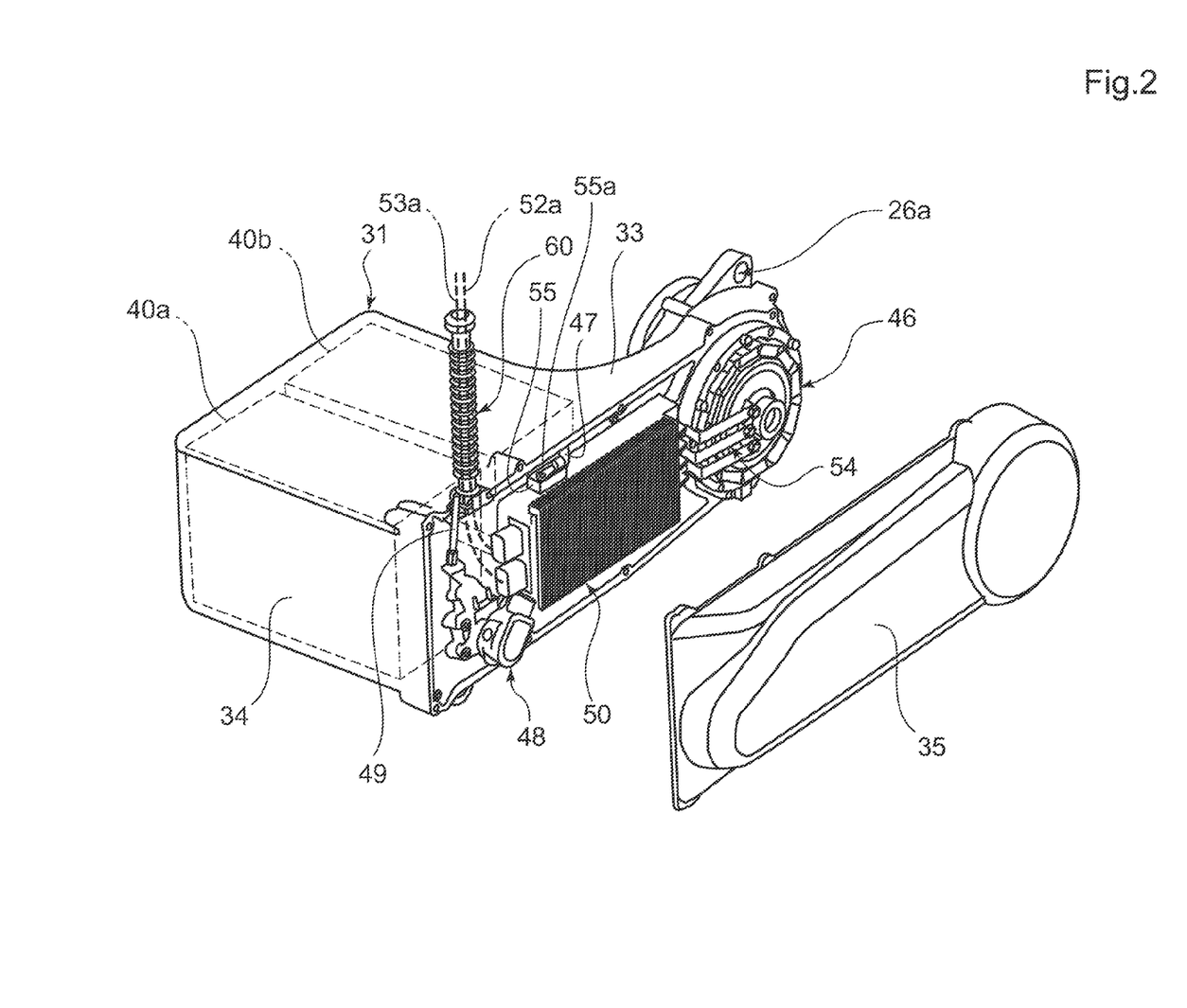
FIG. 2 is a perspective view illustrating a state where a swing arm cover is separated from a main body case of the swing arm.
Figure 3:
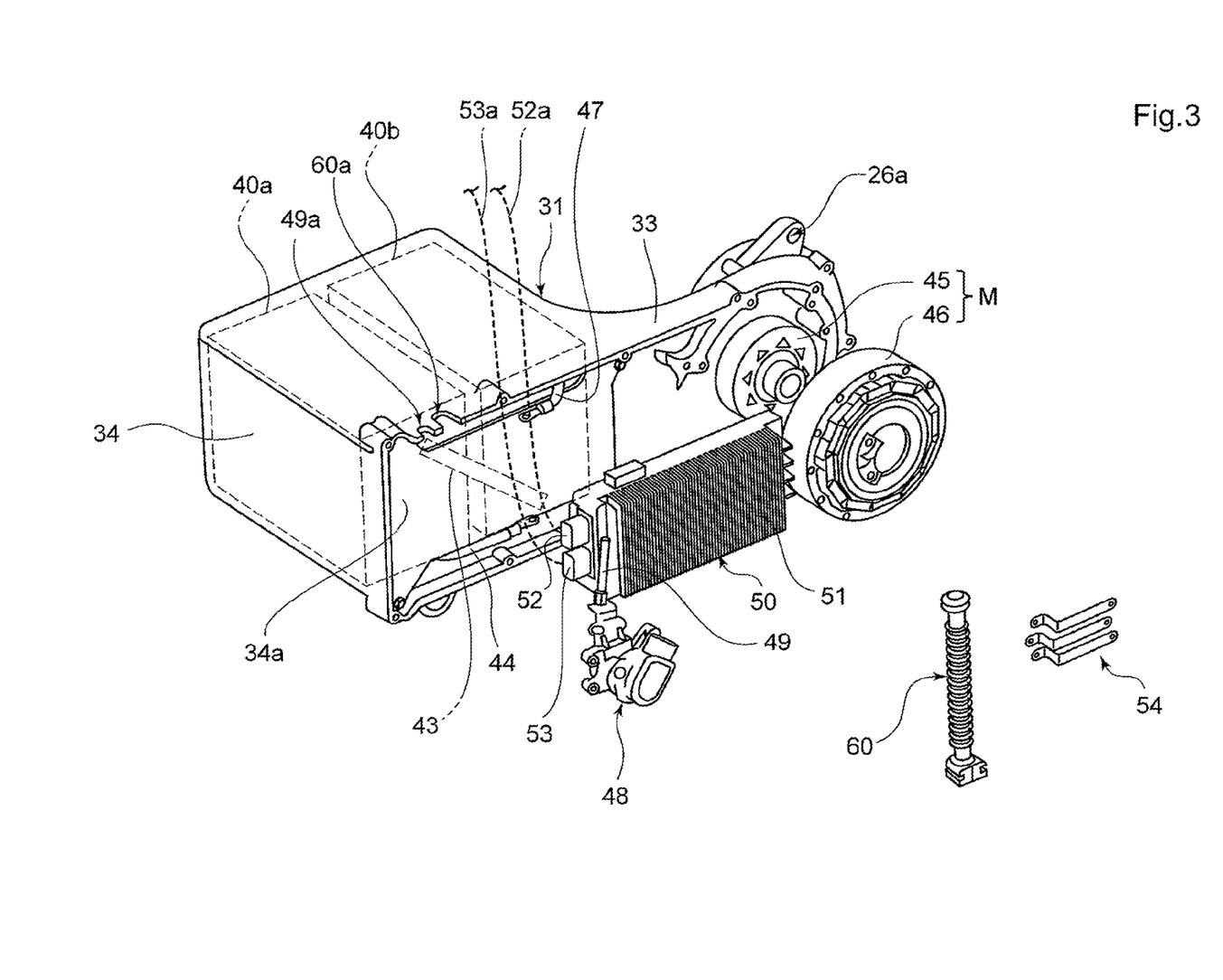
FIG. 3 is a perspective view illustrating a state where a PCU and an electric motor are separated from the main body case.
Figure 4:
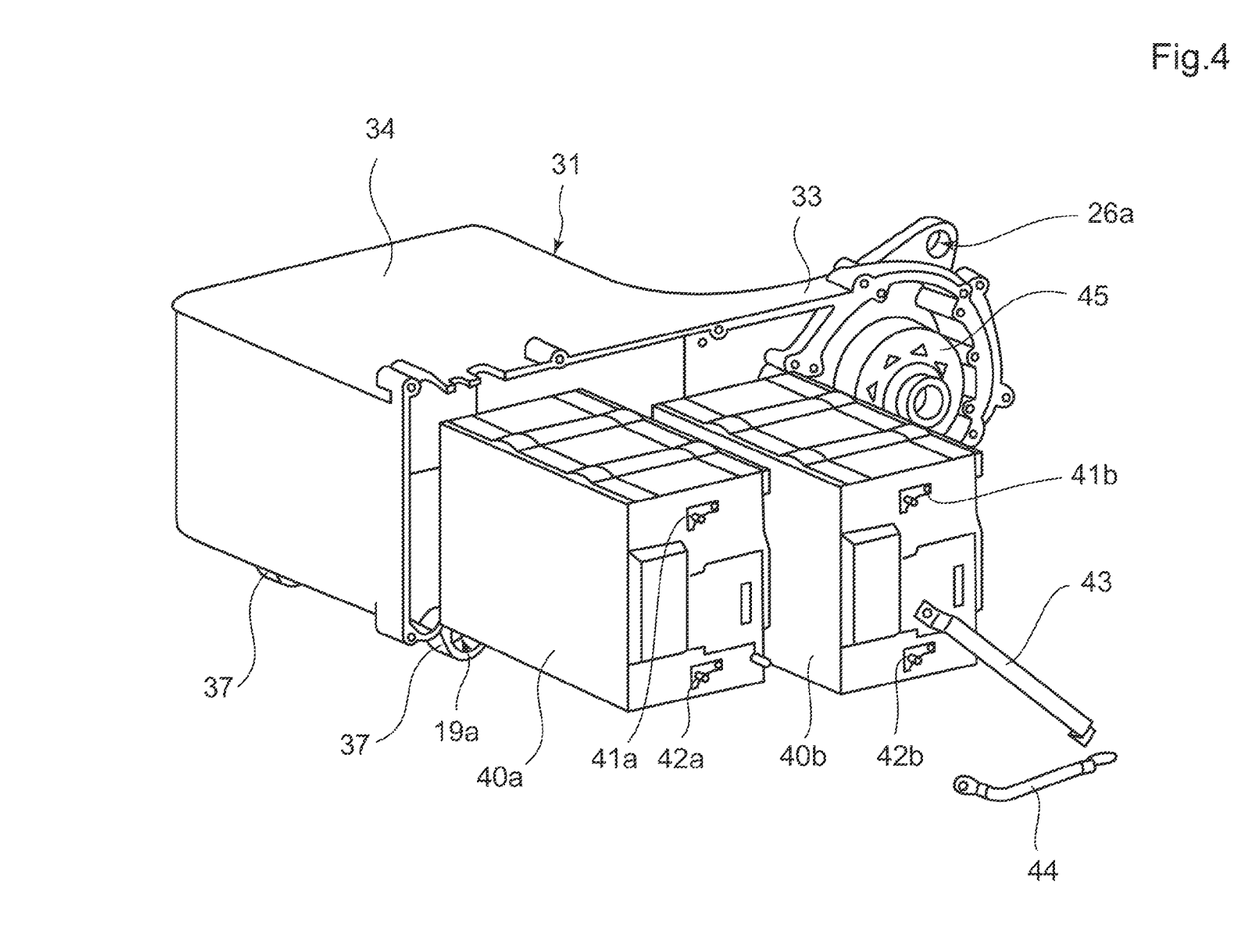
FIG. 4 is a perspective view illustrating a state where battery modules are separated from the main body case.

FIGS. 2, 3, and 4 are exploded perspective views illustrating the swing arm 30. FIG. 2 illustrates a state where the swing arm cover 35 is separated from the main body case 31 of the swing arm, FIG. 3 illustrates a state where the PCU 50 and the electric motor M are separated from the main body case 31, and FIG. 4 illustrates a state where the battery modules 40a and 40b are separated from the main body case 31.

As described above, the swing arm 30 is formed of a metal such as aluminum and has a partially hollow structure. The swing arm 30 is a cantilever type swing arm configured to support the rear wheel WR with an arm portion 33 provided at the left side in the vehicle width direction. Referring to FIG. 4, a pair of left and right pivot flanges 37, in which penetration holes 19a are formed to receive the swing shaft 19 (refer to FIG. 1), is provided on a vehicle body front lower side of the main body case 31.

Referring to FIG. 4, the battery modules 40a and 40b having the same structure can be individually inserted from the left side in the vehicle width direction into a wide case portion 34 formed at a vehicle body front side of the main body case 31. The battery modules 40a and 40b are lithium ion battery modules including a plurality of cells. For example, each of the battery modules 40a and 40b includes five cells arranged in the vehicle width direction.

Plus terminals 41a and 41b and minus terminals 42a and 42b are respectively provided on left lateral sides of the battery modules 40a and 40b in the vehicle width direction. A conductive bus bar 43 connects the plus terminal 41a of the battery module 40a to the minus terminal 42b to connect the battery modules 40a and 40b in series. An end of a minus-side line 44 is connected to the minus terminal 42a of the battery module 40a.

A rotor 45 of the electric motor M is connected to the axle 32 of the rear wheel WR through a speed reduction mechanism (not shown). An installation hole 26a is formed in a rear upper portion of the main body case 31 to install the rear cushion 26 (refer to FIG. 1).

Referring to FIGS. 2 and 3, the battery modules 40a and 40b are accommodated in the main body case 31, and a partition plate 34a, which is an insulating member formed of a material such as a resin, is installed on the main body case 31 using a plurality of bolts so as to cover the left lateral sides of the battery modules 40a and 40b in the vehicle width direction. As shown in FIG. 3, the other end of the minus-side line 44 connected at one end to the minus terminal 42a of the battery module 40a is drawn outward to the vehicle width left side through a lower gap of the partition plate 56, and the other end of a plus-side line 47 connected at one end to the plus terminal 41b of the battery module 40b is drawn outward to the vehicle width left side through an upper gap of the partition plate 34a.

The stator 46 of the electric motor M is fixed to the main body case 31 in a manner such that the stator 46 covers the left side of the rotor 45 in the vehicle width direction. The PCU 50 is disposed at a vehicle body front side of to the stator 46. The PCU 50 includes a PCU case (described later) formed of a highly heat-conductive material such as aluminum, and a plurality of cooling fins 51 are provided on the left side of the PCU case in the vehicle width direction. Connectors 52 and 53 are provided on an end portion of a vehicle body front side of the PCU 50 in a state where the connectors 52 and 53 are electrically insulated from the PCU case, so as to connect harnesses 52a and 53a drawn toward a vehicle body side to the PCU 50.

The harnesses 52a and 53a may be electric wires such as wires for connecting the battery modules 40a and 40b to an external power source (for example, a 100-V commercial power source) to charge the battery modules 40a and 40b, wires for transmitting vehicle speed sensor signals for detecting the speed of the front wheel WF, and wires for transmitting ignition switch manipulation signals.

The throttle position sensor 48 configured to be operated using the throttle cable 49 is disposed on the vehicle body front side of the PCU 50. The throttle position sensor 48 is fixed to the partition plate 34a using fasteners such as bolts. In addition, the vehicle body front side of the PCU 50 is fixed to the partition plate 34a, and the vehicle body rear side thereof is fixed to the main body case 31 using fasteners such as bolts. Here, since the vehicle body rear side of the PCU 50 extends to a position overlapping the arm portion 33 when viewed from the vehicle body lateral side, the PCU case can be used as a rigid member for the main body case 31 by fixing the PCU 50 to the main body case 31 using bolts, so as to increase the rigidity of the arm portion 33.

After the stator 46, the PCU 50, and the throttle position sensor 48 are installed on the main body case 31, three-phase bus bars 54 and the duct 60 having a hollow pipe shape are installed to supply power from the PCU 50 to the stator 46. Since the PCU 50 and the stator 46 are disposed close to each other, the three-phase bus bars 54 can be short.

The duct 60 is installed using a duct notch 60a (refer to FIG. 3) formed in the edge of a vehicle width left side of the wide case portion 34. In addition, the throttle cable 49 of the throttle position sensor 48 is configured to be fitted into a cable notch 49a (refer to FIG. 3) adjacent to a vehicle body front side of the duct notch 60a.

An end of the plus-side line 47 is connected to the plus terminal 41b of the battery module 40b through a fuse 105 (described later with reference to FIGS. 5 and 9), and the other end of the plus-side line 47 is connected to a PCU-side plus terminal 55a formed on the topside of the PCU 50. A PCU side minus terminal 56a (described later with reference to FIG. 8) having the same structure as the plus terminal 55a is provided on the bottom side of the PCU 50, and is connected to the minus-side line 44 (refer to FIG. 4).

Referring to FIG. 2, the swing arm cover 35 is hermetically attached to the main body case 31 to prevent permeation of moisture, dust, and the like. In this case, even though the inside of the swing arm 30 is heated due to heat generated by the battery modules 40a and 40b, the PCU 50, and the electric motor M while the electric vehicle runs, heat is effectively dissipated from the swing arm 30 through the duct 60 in addition to heat dissipation from the surface of the main body case 31 due to wind generated during the traveling of the electric vehicle. In the current embodiment, the harnesses 52a and 53a drawn toward the vehicle body side can be inserted in the duct 60 to use the duct 60 as a protective member for the harnesses 52a and 53a as well as using the duct 60 as a cooling structure for heat generating members such as the electric motor M.

In addition, since the battery modules 40a and 40b and the PCU 50 are disposed in the swing arm 30 together with the electric motor M, a cooling structure other than the duct 60 is not necessary, thereby simplifying the structure of the vehicle body and reducing the number of necessary parts.

The duct 60 is not limited to the case where the upper end portion of the duct 60 is connected to the lower portion of the storage box 21 (refer to FIG. 1). That is, the upper end portion of the duct 60 may be connected to any other connection portion of the vehicle body. For example, a cooling box in which an electric fan is disposed may be installed, and the duct 60 may be connected to the cooling box. In addition, an upper opening portion of the duct 60 may be pointed to any side such as a vehicle body front side or a vehicle body rear side.

Figure 5:
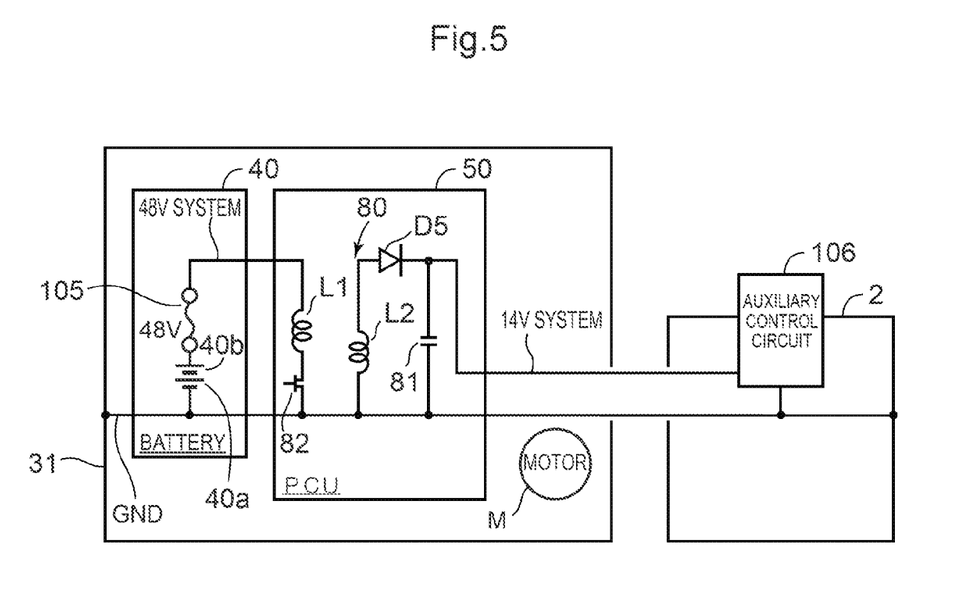
FIG. 5 is a schematic view illustrating an entirety of an electric power system of the electric vehicle control device.

FIG. 5 is a schematic view illustrating the entirety of the electric power system of the electric vehicle control device, in which reference numerals used in FIGS. 2 to 4 are used to denote the same or equivalent elements. Referring to FIG. 5, the battery modules 40a and 40b apply high voltage (for example, 48 V) to a down-regulator 80 disposed in the PCU 50 through the fuse 105. The minus-side of the battery module 40a is connected to the main body case 31 of the swing arm 30 through an earth line GND.

The down-regulator 80 includes a primary coil L1 and a secondary coil L2, and the minus-side of the primary coil L1 is connected to the earth line GND through a switching device (FET) 82. A diode D5 is connected in series to the secondary coil L2, and a condenser 81 is connected in parallel to the secondary coil L2. The output side of the down-regulator 80 is connected to an auxiliary control circuit 106 provided on the vehicle body frame 2 through the main body case 31 of the swing arm 30. That is, the voltage of the battery modules 40a and 40b is lowered by the down-regulator 80 (for example, to 14 V) and is input to the auxiliary control circuit 106. The auxiliary control circuit 106 controls general electric components other than the electric motor M and the battery modules 40a and 40b. For example, the auxiliary control circuit 106 controls lighting devices such as the headlight 10 and the tail light device, and display of the meter device 9.

According to the structure shown in FIG. 5, the battery modules 40a and 40b, the fuse 105, and the motor M are disposed in the main body case 31 so as to isolate a high-voltage region from outside environments. In addition, even though battery voltage (for example, 48 V) is applied to the main body case 31, a resistance level necessary for sufficiently reducing a current flowing to the outside can be ensured by the main body case 31. This is because the earth line GND is connected to the main body case 31.

Figure 6:
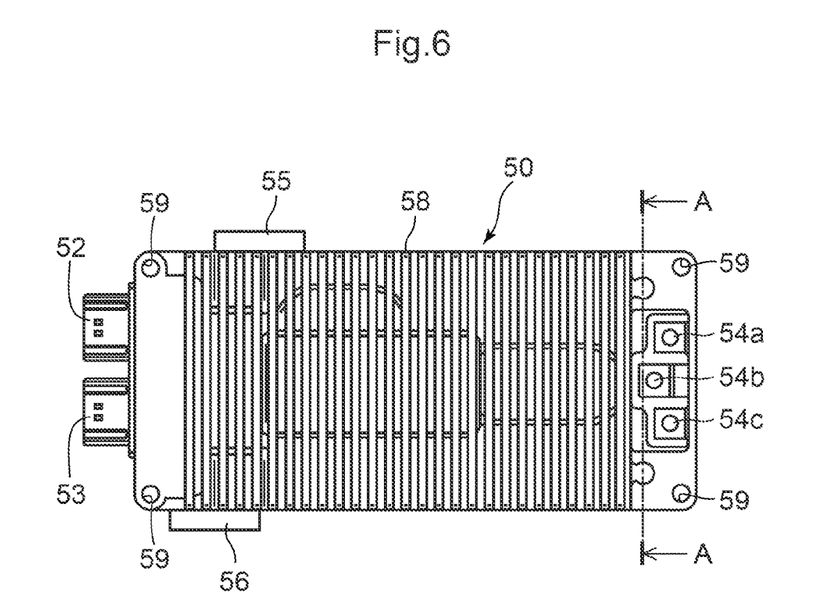
FIG. 6 is a front view of the PCU.
Figure 7:
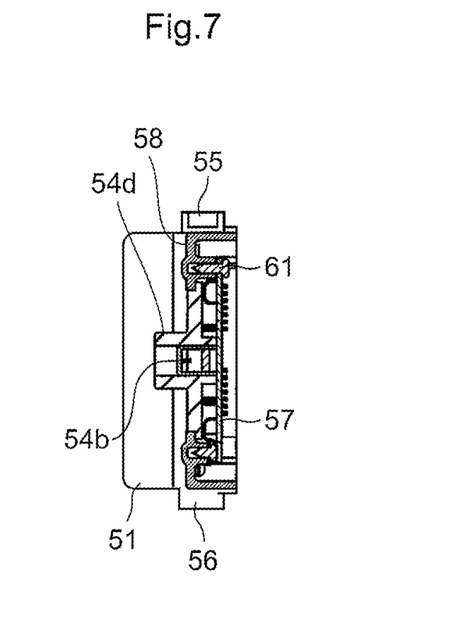
FIG. 7 is a sectional view taken along line A-A of FIG. 6.
Figure 8:
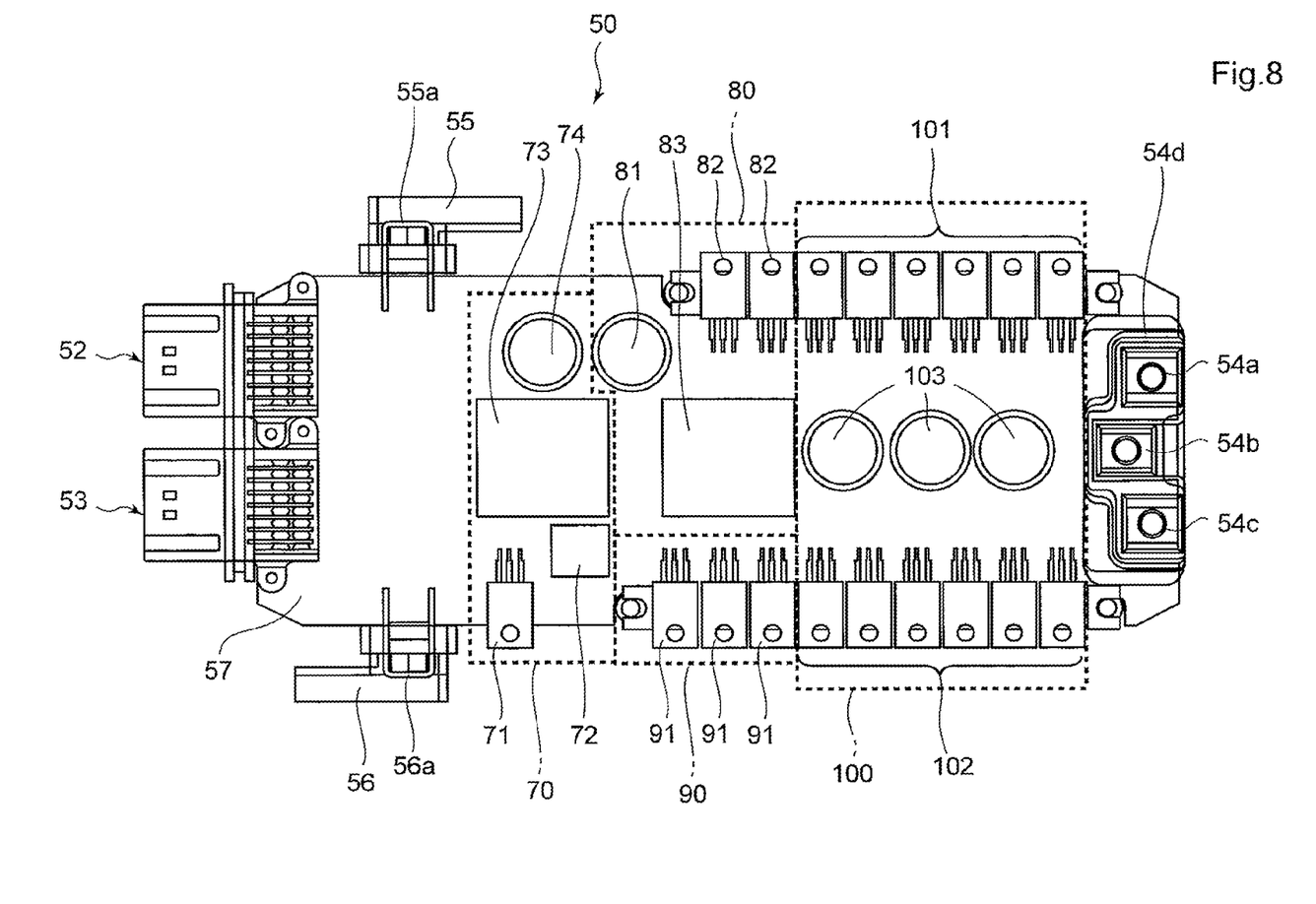
FIG. 8 is a front view illustrating a PCU main body after detaching the PCU case having cooling fins from the PCU main body.

FIG. 6 is a front view of the PCU 50, FIG. 7 is a sectional view taken along line A-A of FIG. 6, and FIG. 8 is a front view illustrating a PCU main body after detaching the PCU case having the cooling fins 51 from the PCU main body. In FIGS. 6 to 8, reference numerals used in FIGS. 2 to 5 are used for denoting the same or equivalent elements.

Referring to FIG. 8, the PCU 50 includes a plate-shaped board 57 on which various electronic devices are mounted. As shown in FIG. 8, electronic devices mounted on the board 57 are broadly divided into four groups: a charger circuit 70, the down-regulator 80, a semiconductor contactor 90, and a motor drive circuit 100.

The charger circuit 70 is disposed at a vehicle body front side and includes an FET device 71, transformers 72 and 73, and a condenser 74. The down-regulator 80 includes the condenser 81, two FET devices 82, and a transformer 83. The semiconductor contactor 90 is an FET contactor including three FET devices 91. The motor drive circuit 100 disposed at a vehicle body rear side includes six FET devices 101, three condensers 103, and six FET devices 102.

When the PCU 50 is installed on the vehicle body, the PCU-side plus terminal 55a and the PCU-side minus terminal 56a having terminal covers 55 and 56 are on front upper and lower sides of the charger circuit 70. The connectors 52 and 53 are attached to the front end portion of the board 57 for connection with the harnesses 52a and 53a (refer to FIGS. 2 and 3). A U-phase electrodes 54a, a V-phase electrode 54b, and a W-phase electrode 54c are provided on the rear end portion of the board 57 for connection with the three bus bars 54 (refer to FIG. 3).

The U-phase electrodes 54a, the V-phase electrode 54b, and the W-phase electrode 54c include an electrically insulative electrode cover 54d. As shown in FIG. 6, penetration holes 59 are formed in the four corners of a PCU case 58 for inserting bolts through the holes when the PCU 50 is installed on the partition plate 34a (refer to FIG. 3) and the main body case 31. The board 57 includes a conductive pattern which forms the earth line GND, and as shown in FIG. 7, the conductive pattern and the PCU case 58 are connected by tightening a screw 61 from the rear side of the CPU case 58, that is, a side facing the swing arm 30, so that the PCU 50 can be earthed to the main body case 31.

Figure 9:
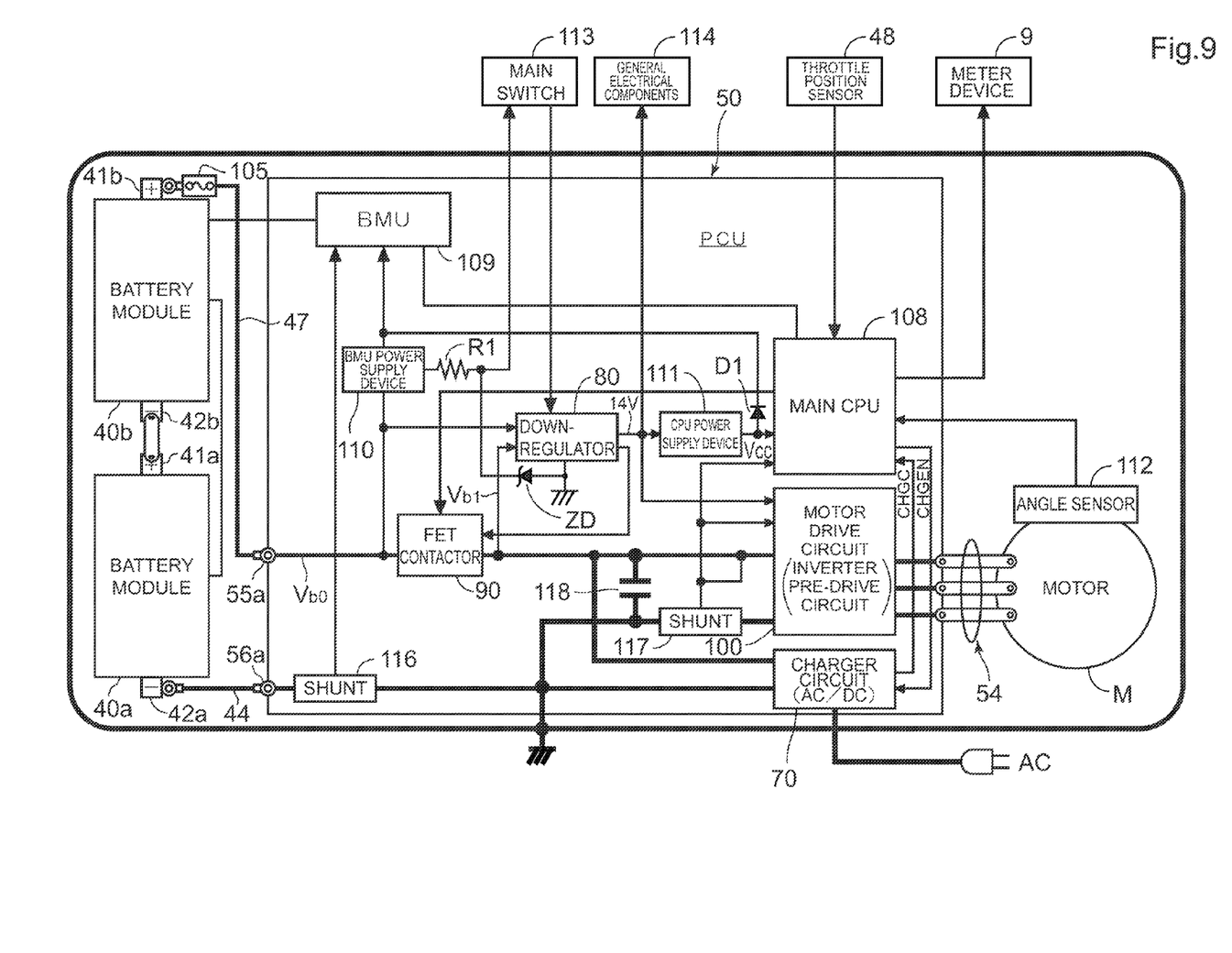
FIG. 9 is a main circuit diagram of the electric vehicle control device.

FIG. 9 is a main circuit diagram of the electric vehicle control device. As described above, the PCU 50 includes the charger circuit 70, the down-regulator 80, the contactor (FET contactor) 90, and the motor drive circuit 100. In addition, the PCU 50 includes a main CPU 108, a BMU (BMU-CPU) 109, and two voltage down-converters. One of the voltage down-converters is a BMU power supply device 110 for lowering the output voltage of a battery 40 and supplying the lowered voltage to the BMU 109 which is a battery monitoring unit for monitoring states of charge of the battery modules 40a and 40b and managing charging and discharging of the battery modules 40a and 40b. The other of the voltage down-converters is a CPU power supply device (5V-REG) 111 for lowering the output voltage of the down-regulator 80 and supplying the lowered voltage to the main CPU 108 as a control voltage Vcc. The BMU power supply device 110 and the CPU power supply device 111 may be constituted by three-terminal regulators. In the following description, when the battery modules 40a and 40b are collectively described, they may be referred to as a battery 40.

The charger circuit 70 is a substantially AC/DC converter for converting 30-V AC voltage into 48-V DC voltage. The BMU power supply device 110 lowers a battery voltage Vb0 (48 V) received from the battery 40 to a BMU control voltage (5 V) and supplies the BMU control voltage to the BMU 109. Battery voltage is supplied to the BMU power supply device 110 as well as the down-regulator 80. The down-regulator 80 receives a battery voltage Vb0 directly from the battery 40 and a battery voltage Vb1 indirectly from the contactor 90. During the time of recharge, a voltage from the charger circuit 70 may be input as the voltage Vb1.

The contactor 90 is provided on a plus line of the battery 40, and an end of the contactor 90 is connected to the battery plus terminal 41b through the PCU-side plus terminal 55a, the plus-side line 47, and the fuse 105. The other end of the contactor 90 is connected to the input side of the down-regulator 80 and the output side of the charger circuit 70. In addition, the other end of the contactor 90 is also connected to the input side of the motor drive circuit 100. The motor drive circuit 100 includes an inverter, which includes a plurality of FET devices, and a pre-driver for driving the inverter.

Three-phase output of the motor drive circuit 100 is connected to U-phase, V-phase, and W-phase coils of the electric motor M through the three-phase bus bars 54. A magnetic pole sensor (angle sensor) 112 is provided on the electric motor M to detect the rotation angle of the rotor 45 (refer to FIGS. 2, 3, etc.).

Devices such as a main switch 113, general electrical components 114, the throttle position sensor 48, and the meter device 9 are disposed inside the swing arm 30 on an outer side thereof, that is, on the side close to the vehicle body frame 2. The main switch 113 is disposed between the BMU power supply device 110 and the down-regulator 80. The general electrical components 114 receive a voltage (14 V) lowered by the down-regulator 80. The throttle position sensor 48 detects the amount of throttle manipulation (accelerator manipulation), i.e. the amount of throttling, and then inputs the detected signal to the main CPU 108. The meter device 9 is driven by the main CPU 108. A detection signal of the angle sensor 112 is input to the main CPU 108 and used to control the motor drive circuit 100.

Shunts 116 and 117 are provided on the earth line GND which is connected to the minus terminal 42a of the battery module 40a through the minus-side line 44. A current detected from the shunt 116 is input to the BMU 109, and a current detected from the shunt 117 is input to the main CPU 108 and the pre-driver of the motor drive circuit 100. A condenser 118 is disposed between the shunts 116 and 117.

A resistor R1 functioning as limitation resistance is connected between the main switch 113 and the BMU power supply device 110, and a voltage regulating diode ZD is connected to a line branching off from the earth line GND between the resistor R1 and the main switch 113. Owing to the resistor R1 and the voltage regulating diode ZD, voltage and current can be regulated between the main switch 113 and the BMU power supply device 110. In addition, a diode D1 is connected between the output side of the CPU power supply device 111 and the BMU 109.

Figure 10:
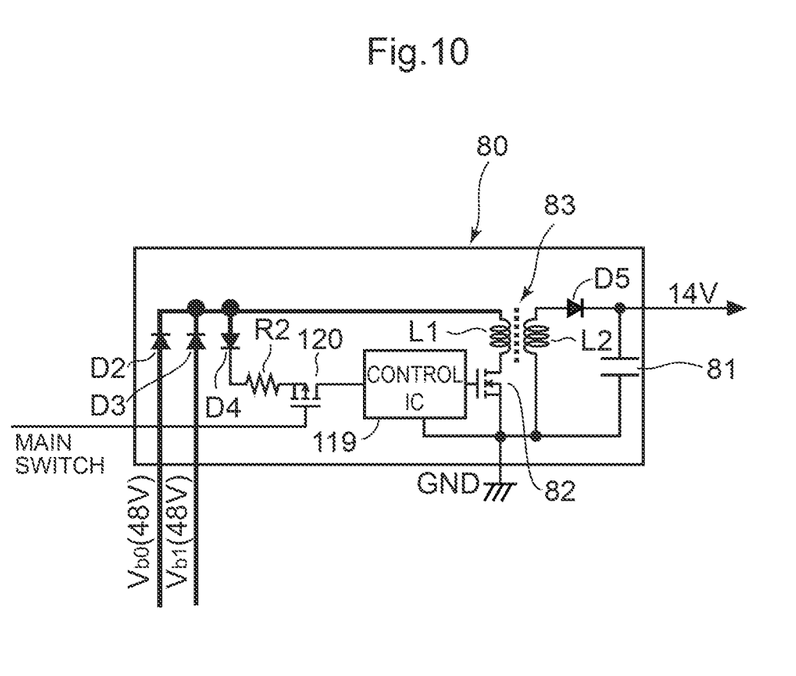
FIG. 10 is a view illustrating an exemplary circuit of a down-regulator.

FIG. 10 is a view illustrating an exemplary circuit of the down-regulator 80. The down-regulator 80 includes a control IC 119 to generate an output for driving a first FET 82 disposed between the primary coil L1 and the earth line GND. The primary coil L1 receives a battery voltage Vb0 from the battery 40 through the diode D2 and a battery voltage Vb1 from the contactor 90 through a diode D3 (both the voltages Vb0 and Vb1 are 48 V).

The cathode sides of the diodes D2 and D3 are connected to the primary coil L1, and a diode D4, a resistor R2, and an FET 120 are provided on a line which branches off from a line connected from the diodes D2 and D3 to the primary coil L1 and connects to the control IC 119. The main switch 113 is connected to the gate of the second FET 120.

The diode D5 is connected in series to an output line of the secondary coil L2, and the condenser 81 is connected to the cathode side of the diode D5 in parallel with the secondary coil L2. In this way, the down-regulator 80 is configured to be a flyback type regulator. However, the down-regulator 80 is not limited to the flyback type. For example, the down-regulator 80 may be a forward type regulator.

Figure 11:
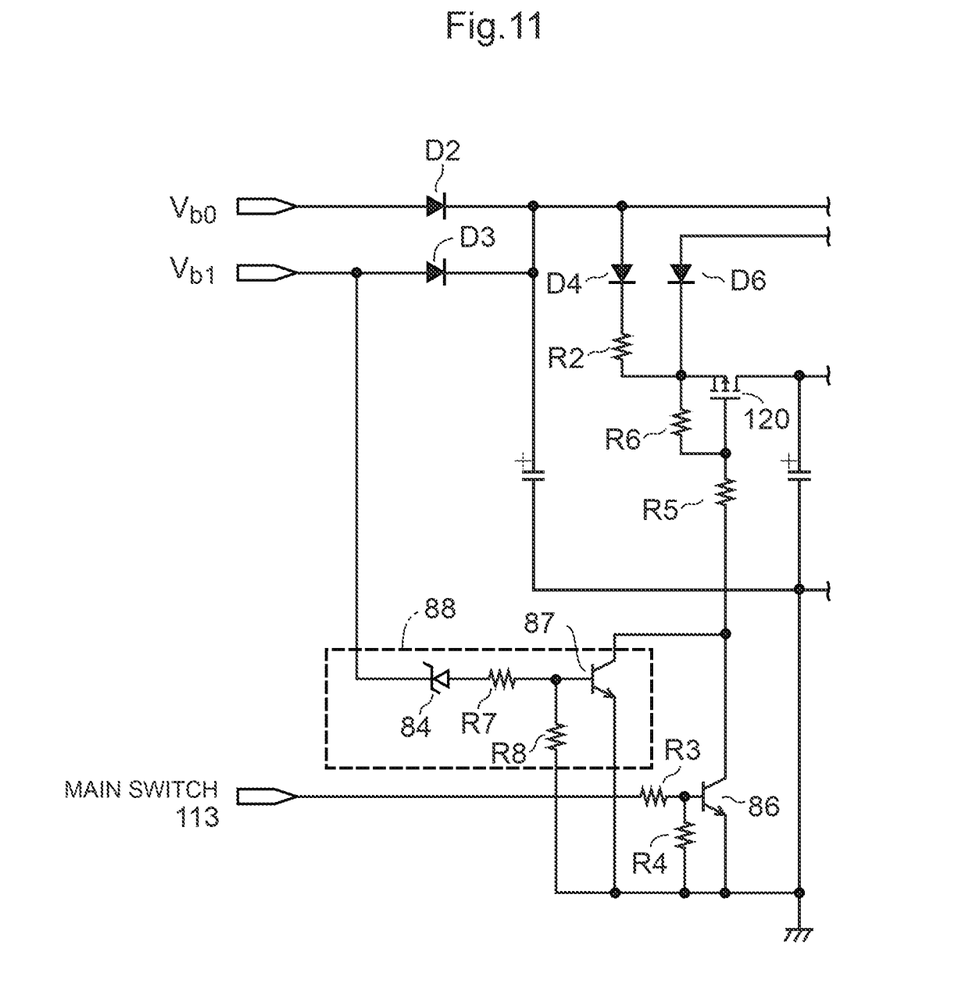
FIG. 11 is a circuit diagram showing a main part of the down-regulator in more detail.

FIG. 11 is a circuit diagram showing a main part of FIG. 10 in more detail. Referring to FIG. 11, the input of the main switch 113 is connected to resistors R3 and R4, and a connection point between the resistors R3 and R4 is connected to the base of a first transistor (bipolar transistor) 86. The emitter of the first transistor 86 is earthed, and the collector thereof is connected to the gate of the second FET 120 through a resistor R5. A battery voltage Vb0 is connected to the drain of the second FET 120 through the diodes D2 and D4 and the resistor R2. The source of the second FET 120 is connected to a power terminal of the control IC 119 (refer to FIG. 10). In addition, a driving voltage (14 V) is connected to the gate and drain of the second FET 120 through a diode D6 and a resistor R6.

A battery voltage Vb1 is connected to the base of a second transistor (bipolar transistor) 87 through a zener diode 84 and a resistor R7. The emitter of the second transistor 87 is earthed, and the collector of the second transistor 87 is connected to the second FET 120 through the resistor R5. A connection point between a resistor R7 and the base of the second transistor 87 is earthed through a resistor R8. A startup circuit 88 for the time of recharge is configured to include the zener diode 84, the resistors R7 and R8, and the second transistor 87.

An operation of the electric vehicle control device will now be described with reference to the circuit structures shown in FIGS. 9 to 11. In an initial state, the main switch 113 and the contactor 90 are open, and a control voltage is not supplied to the main CPU 108 and the motor drive circuit 100. A battery voltage Vb0 is applied to the BMU power supply device 110, and the BMU power supply device 110 applies a constant voltage to the BMU 109 after converting the battery voltage Vb0 to a constant voltage BMU-VCC. In this way, the BMU 109 receives operating power and continuously monitors the state of the battery 40. Owing to the diode D1, an output of the BMU power supply device 110 is not applied to the main CPU 108.

When the main switch 113 is turned on, a battery voltage Vb0 is applied to the base of the first transistor 86 through the resistor R1 and the main switch 113 to drive the first transistor 86 so that the gate voltage of the second FET 120 can be lowered to turn on the second FET 120. In this way, the battery voltage Vb0 is applied to the control IC 119 as a power voltage Vcc to operate the control IC 119. The control IC 119 turns on and off the first FET 82 according to a predetermined on/off time ratio. A current flowing in the primary coil L1 increases while the first FET 82 is turned on. When the first FET 82 is turned off, a current flows in the secondary coil L2 to charge the condenser 81 through the diode D5. A voltage of the condenser 81 charged by the secondary coil L2, that is, an output voltage of the down-regulator 80 is a voltage lowered to, for example, 14V. The voltage lowered by the down-regulator 80 is lowered to 5V by the CPU power supply device 111 and input to the main CPU 108 as a CPU control voltage VCC.

When the CPU control voltage VCC is input to the main CPU 108, the main CPU 108 starts to operate and supply a turn-on signal to the contactor 90. The contactor 90 to which a voltage is applied from the down-regulator 80 is turned on in response to the turn-on signal from the main CPU 108. After the contactor 90 is turned on, a battery voltage Vb1 is applied from the battery 40 to the motor drive circuit 100 and the main CPU 108 is operated. When an operation instruction is input from the main CPU 108 to the motor drive circuit 100, an inverter inside the motor drive circuit 100 is operated to supply an operating current to the electric motor M. The driving current to the electric motor M is determined according to the amount of throttling input from the throttle position sensor 48. Timing for supplying a current to U-phase, V-phase, and W-phase of the electric motor M is determined based on a detection signal of the angle sensor 112.

When the battery 40 is recharged, the charger circuit 70 is connected to an AC power source (not shown). For example, if a commercial 100-V AC voltage is converted to a certain voltage (e.g., 30 V) by a transformer (not shown) and is input to the charger circuit 70, the charger circuit 70 converts the AC voltage into a DC voltage (48 V) and supplies the DC voltage to the contactor 90 and the down-regulator 80. During the time of recharge, as the main switch 113 is turned on, the down-regulator 80 operates the main CPU 108, and the main CPU 108 turns on the contactor 90 to start recharging the battery 40. Since the BMU 109 continuously monitors the state of battery charge, the main CPU 108 operates according to the state of the battery input from the BMU 109 to turn on the contactor 90 in the case of being insufficiently charged and to stop recharging by turning off the contactor 90 in the case where the battery is fully charged or a predetermined battery voltage is detected.

During the time of recharge, the startup circuit 88 for the time of recharge operates to maintain the second transistor 87 at a turned-on state while the battery voltage Vb1 is equal to or higher than a predetermined voltage (Vb2) set by the zener diode 84. Owing to this, the second FET 120 is kept at a turned-on state.

In this way, according to the current embodiment, the PCU 50 is configured to have elements necessary for controlling the battery 40 mounted on a single board so that the electric vehicle control device can have a very simple structure. Note that the charger circuit 70 is not necessarily be integrated in the PCU 50. That is, the charger circuit 70 may be provided as a separate part.

Since the electric vehicle control device of the current embodiment has a simple structure, for example, when the electric vehicle control device is disposed in a swing arm of an electric two-wheeled vehicle together with an electric motor and a battery, assembly work can be easily carried out while saving a space and costs.

The embodiment is an exemplary embodiment of the present invention, and those of ordinary skill in the related art could modify the embodiment by applying well-known technology thereto. For example, although the battery 40 is configured to include two battery modules to output 48 V, the output voltage of the battery 40 is not limited to 48 V. For example, the battery 40 may be configured to include three battery modules to output 72 V. Furthermore, the electric vehicle is not limited to a two-wheeled vehicle. For example, the electric vehicle may be a saddle type three- or four-wheeled vehicle having a swing arm.

REFERENCE SIGNS LIST

1: electric vehicle,
2: vehicle body frame,
19: swing shaft,
30: swing arm,
31: main body case,
35: swing arm cover,
40: battery,
40a, 40b: battery module,
48: throttle position sensor,
49: throttle cable,
50: PCU,
57: plate-shaped board,
61: screw,
70: charger circuit,
80: down-regulator,
83: transformer,
90: semiconductor contactor,
100: motor drive circuit,
105: fuse,
108: main CPU,
109: BMU,
110: BMU power supply device,
111: CPU power supply device

The invention claimed is:

1. An electric vehicle control device having a motor drive circuit for driving a vehicle drive motor using power of a battery, a battery monitoring unit for monitoring a state of the battery, and a main CPU for controlling the motor drive circuit, the electric vehicle control device comprising:
 a BMU power supply device configured to lower an output voltage of the battery to a value suitable for a control voltage for the battery monitoring unit;
 a down-regulator configured to lower the output voltage of the battery to a value suitable for an input to a CPU power supply device which generates a control voltage for the main CPU;
 a contactor provided on a plus-side line between the battery and the motor drive circuit so as to be opened and closed in response to an instruction of the main CPU; and
 a main switch configured to open and close a passage through which a voltage of a control power is input to the down-regulator,
 wherein the control power for the down-regulator is generated by the BMU power supply device,
 wherein an output of the BMU power supply device is input to the down-regulator through the main switch as control power.

2. The electric vehicle control device according to claim 1, wherein the motor drive circuit, the battery monitoring unit, the main CPU, the BMU power supply device, the down-regulator, and the contactor are mounted on a single board to configure a control module.

3. The electric vehicle control device according claim 1, wherein the down-regulator is a flyback or forward type regulator.

4. The electric vehicle control device according to claim 1, wherein
 the electric vehicle control device is used for an electric vehicle in which a driving wheel is supported by a swing arm configured to be vertically swung with reference to a vehicle body frame,
 the swing arm comprises a main body case,
 the vehicle drive motor, the battery, and a control module are disposed in the main body case of the swing arm,
 a fuse is provided between a plus terminal of the battery and a plus terminal of the control module, and
 minus terminals of the battery and the control module are earthed to the main body case of the swing arm.

5. The electric vehicle control device according to claim 4, wherein a board comprises a conductive pattern forming an earth line, and the control module is earthed to the main body case by coupling the conductive pattern to a case which is a conductive material of the control module using a screw.

* * * * *